Feb. 19, 1963   N. CIRILLO ETAL   3,077,602
CONTINUOUS STAPLING MACHINE
Filed Feb. 21, 1961   4 Sheets-Sheet 1

INVENTORS
NICHOLAS CIRILLO
VINCENT LOVRICH
BY
ATTORNEY

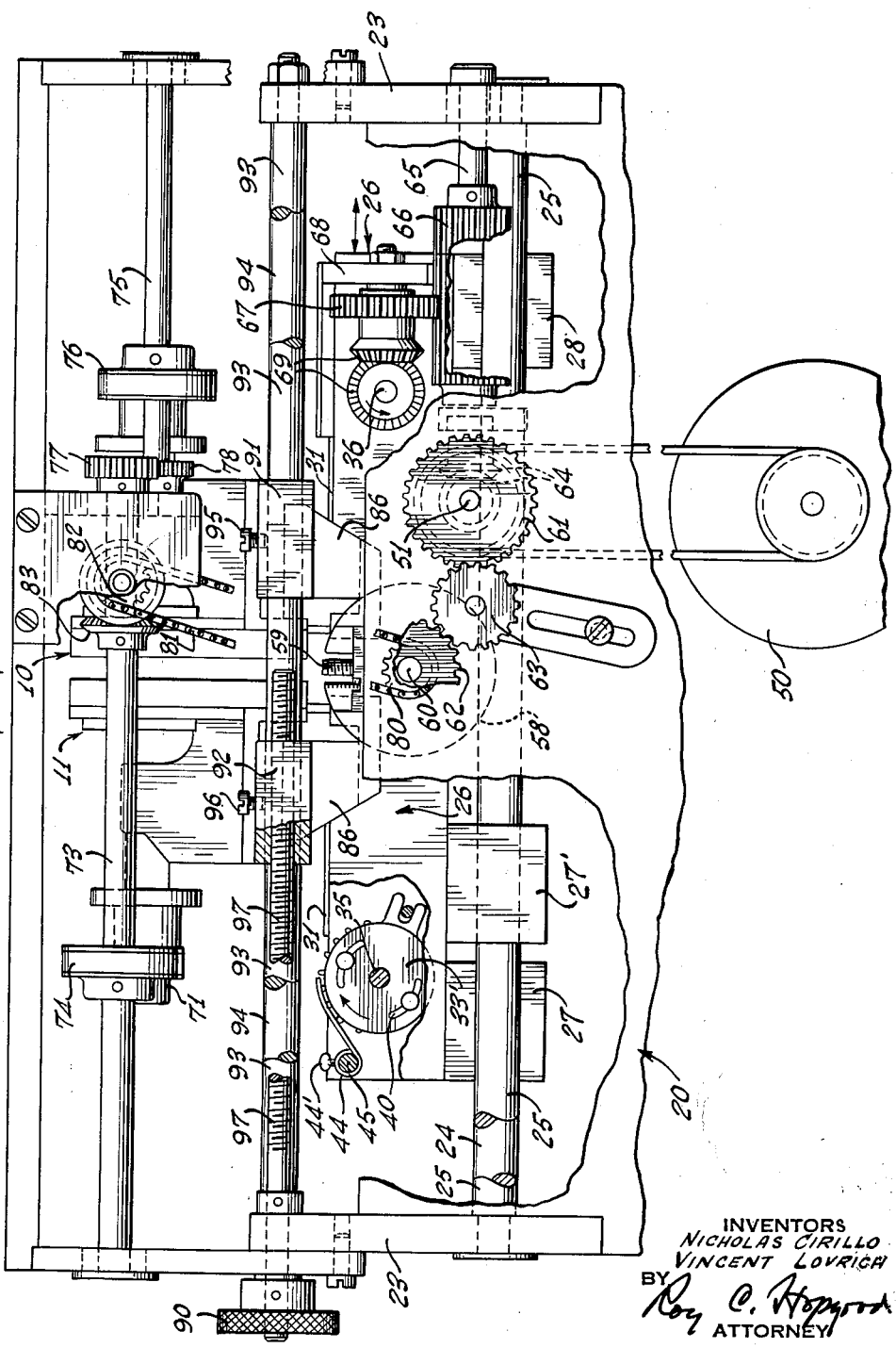

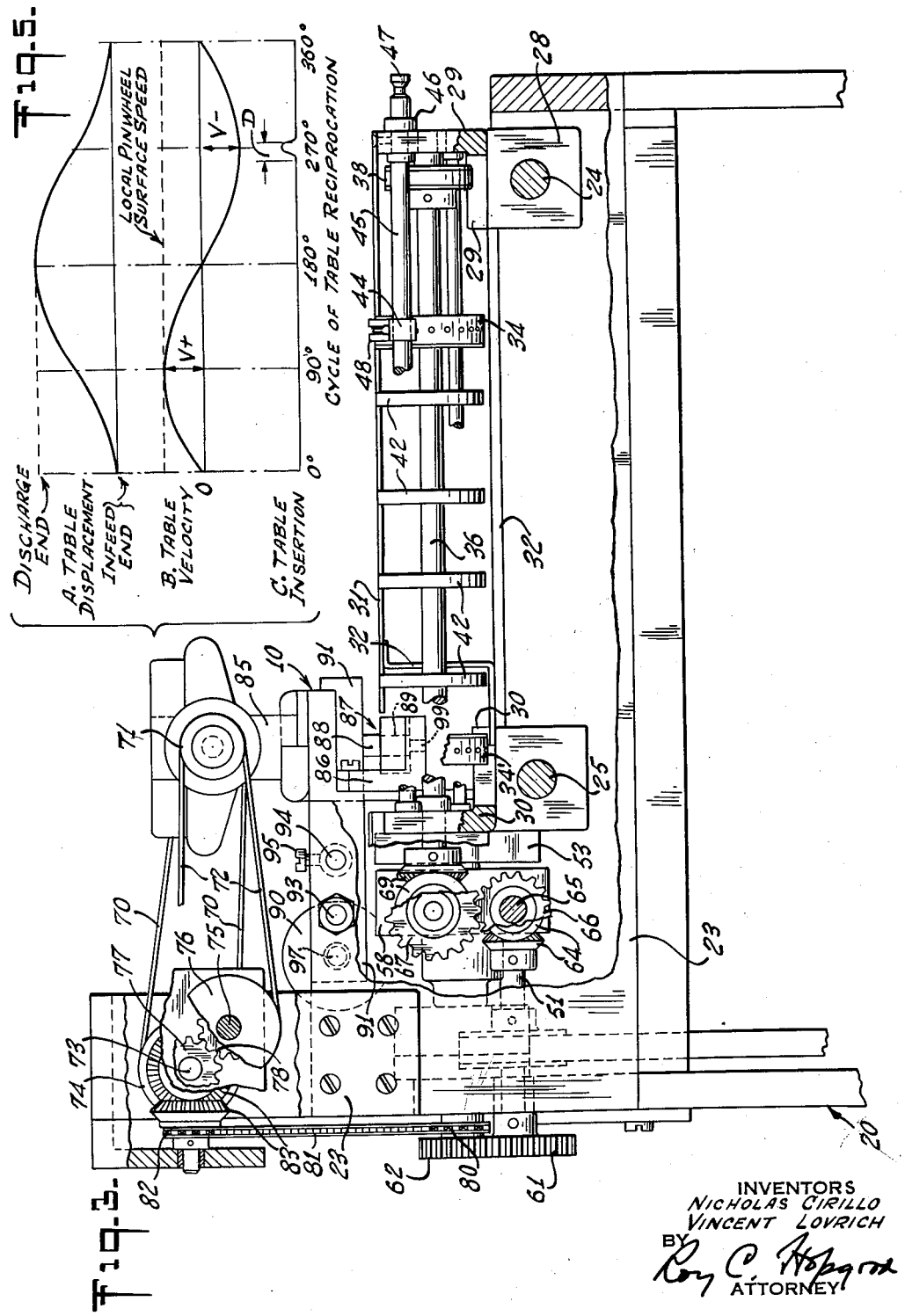

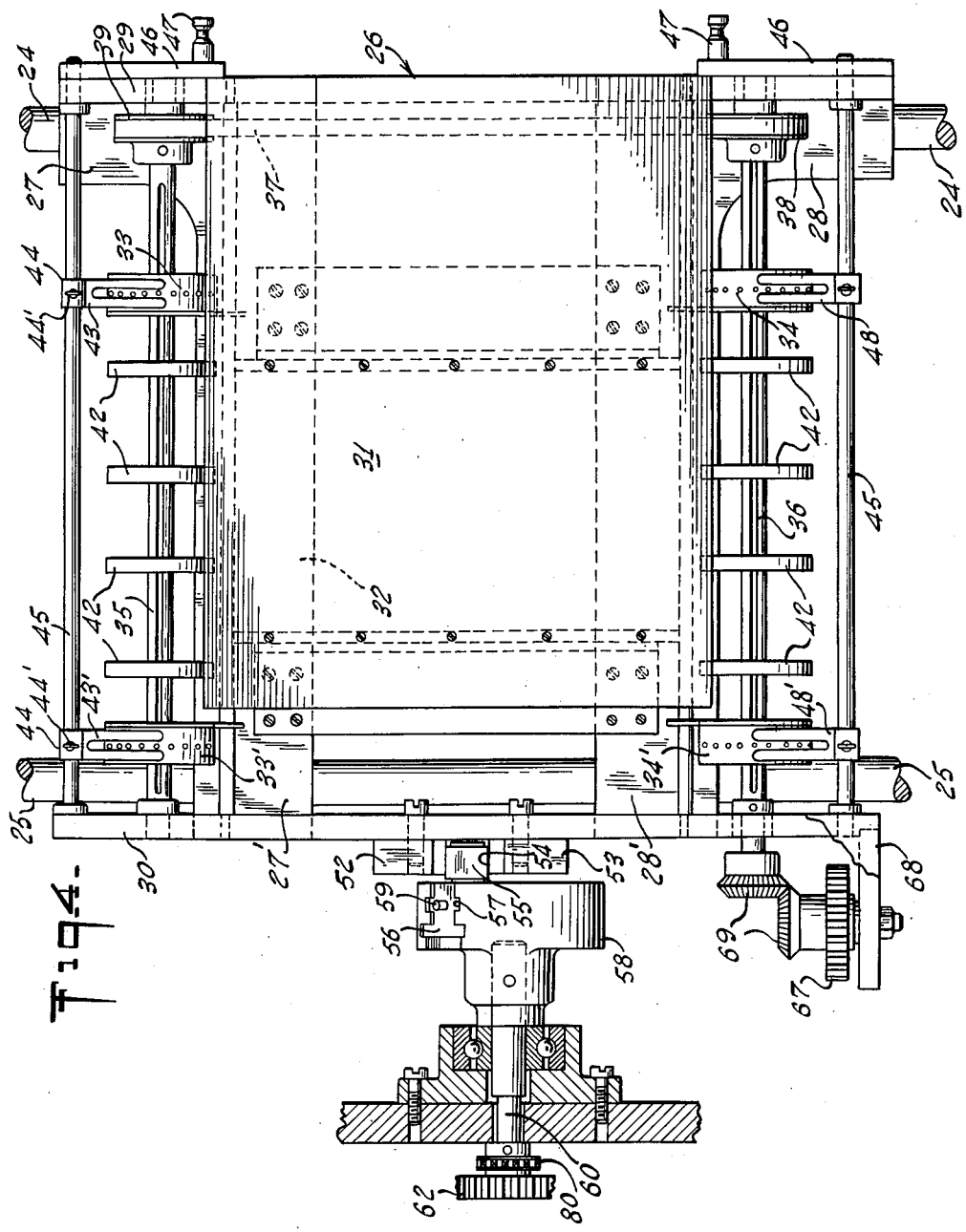

United States Patent Office 3,077,602
Patented Feb. 19, 1963

3,077,602
CONTINUOUS STAPLING MACHINE
Nicholas Cirillo, Weehawken, and Vincent Lovrich, Hackensack, N.J., assignors to Autographic Business Forms, Inc., South Hackensack, N.J., a corporation of New Jersey
Filed Feb. 21, 1961, Ser. No. 90,865
11 Claims. (Cl. 1—62)

This invention relates to an improved stitching or stapling machine and has application to other types of machines in which intermittent work is to be performed on stock at spaced locations.

In stitching or the like machines, as used for anchoring multiple plies of notched or apertured stock to retain the same in register, it has been the practice to employ stationary stitching heads in an intermittent cycle of successive operations, involving (1) clutching of an index-feed drive to advance by one step the position of the paper or other stock to be stitched or stapled, (2) stopping the stock upon declutching, and (3) performing the stitching operation prior to reclutching to recycle the process. The present commercial machines for performing these operations have definite production-speed limitations that are dictated primarily by the problems of clutching, indexing, declutching, and stopping the feed mechanism, for each and every cycle of the machine. Primarily, these limitations arise from the physical mass of the table or other mechanism which must be accelerated and decelerated to achieve the indexing operation; further limitations arise from the physical damage to the feed apertures of the stapled product, resulting not only in cumulative inaccuracy of staple location, but also in a product which (by reason of damaged feed apertures) cannot be considered useful for intended ultimate use in such manifolding machines as electric accounting machines and typewriters which rely on pin or sprocket devices for form-feeding purposes.

It is an object of the invention to provide an improved machine of the character indicated wherein disadvantages inherent in the prior structures are specifically avoided.

Another object is to provide an improved stitching or the like machine wherein production speed is very substantially increased over that achievable with prior machines.

A further object is to achieve the above objects with mechanism in which transient acceleration and deceleration forces are reduced to zero.

Still another object is to meet the above objects with a machine in which production speed (in terms of stitching operations per unit time) is substantially unaffected by thickness or number of plies to be stitched.

It is a general object of the invention to meet the above objects with a machine characterized by relative simplicity of parts, ease of action, length of life, and ease of set-up for a variety of possible jobs hitherto unattainable.

Other objects and various further features of novelty and invention will be pointed out or will occur to those skilled in the art from a reading of the following specification in conjunction with the accompanying drawings. In said drawings, which show, for illustrative purposes only, a preferred form of the invention:

FIG. 2 is a view in elevation of the back side of the machine of FIG. 1, that is of the side opposite from the operator's side;

FIG. 3 is an end elevation of the machine of FIG. 1, as viewed from the right end of FIG. 2;

FIG. 4 is a plan view of the reciprocating-table portion of FIGS. 1, 2 and 3; and FIG. 5 is a graphical display, involving curves A, B and C, illustrative of a synchronized cycle of operation of the machine of FIG. 1.

Figure 1:
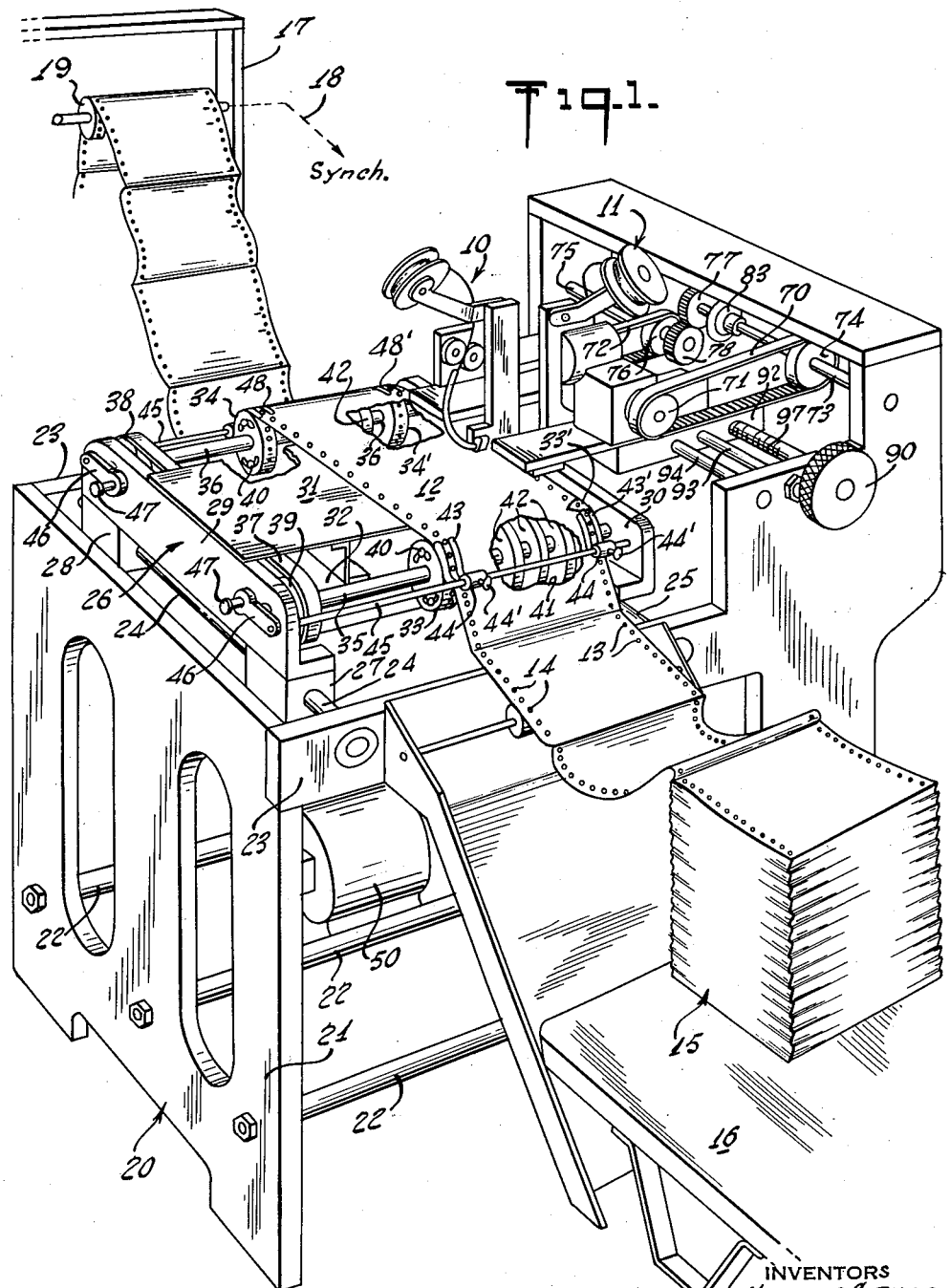
FIG. 1 is a simplified view in perspective showing a machine of the invention operating to perform simultaneous stitching operations at spaced locations on the same margin of commercial business-form paper stock, collated into multiple ply, with spaced apertured edges in register, the operator's side of the machine being exposed and facing to the left of FIG. 1.

Briefly stated, the invention contemplates an improved stock-feeding mechanism in combination with an intermittently working device, such as a stitching or stapling unit, mounted in fixed relation to the stock and its transport mechanism. The machine utilizes a table reciprocably mounted on frame-based elongated guide means which are preferably horizontal, and the table carries stock-feeding means which is continuously run at a local stock-surface speed which is substantially equal to the maximum return-stroke speed of the table. This relation assures that there will be a brief instant in the reciprocating cycle of the table during which an appropriately synchronized stitching operation may be performed by a frame-based and, therefore, stationary stitching head. Various further features will appear in the description below.

Referring to FIG. 1, the invention is shown in application to a machine for performing two simultaneous stitching operations at stitching heads 10—11 which are spaced longitudinally in the sense of movement of stock 12 through the machine. The stock is shown as multiple-ply business-form paper, which may include interleaved carbon paper, having registering edge feed apertures or notches 13—14, and supplied to the machine from a folded collated stack shown resting on a platform 16. As indicated above, the exposed left portion of FIG. 1 represents the operator's side of the machine, so that the supply 15 is located to the right of the operator. After performing the stapling or stitching operation, the stitched paper is removed by suitable take-up means 17, for reassembly in folded condition. A synchronizing connection 18 suggests that the take-up coil 19 of take-up means 17 is operated in synchronism with the basic drive to the stitching machine.

The machine comprises rigid frame means 20 on which the stapling head or heads 10—11 are fixedly mounted. This frame comprises, in the form shown, front and back frame plates 21 spaced rigidly by tie-rods 22 and by right and left side plates 23. The side plates 23 provide support for elongated guide means in the form of front and back rods 24—25 on which a table 26 is reciprocably guided. Firm antifriction support for the table on the rods 24—25 may be achieved by employing so-called ball bushings at spaced locations on each of the rods. In FIG. 1, such bushings are displayed along rod 24 at locations 27—28.

The table 26 may comprise front and back angle members 29—30 spaced by an upper table surface 31 and a lower plate or member 32. The top surface 31 extends short of the ends of the angle member 29—30 so that feed means 33—34 may be carried by the table 26 at the inlet and discharge ends thereof and so that these feed devices may expose their feeding surfaces substantially in the plane of the supporting table surface 31.

The feed means 33—34 may be any one of a number of commercial sprocket-type devices suitable for engaging and driving apertured material of the character indicated. Such devices include so-called tractor-tread pins and disappearing-pin wheels. We have shown the latter variety at 33—34, and these are mounted on spaced shafts 35—36 extending transversely of the path of paper movement and journaled respectively in the side or angle members 29—30. Continuous synchronized drive is imparted to the shafts 35—36 and thus to the pin wheels 33—34 by means not shown but including a sprocket-drive connection by toothed belt 37 between pulleys 38—39 on the shafts 35—36. For initial set-up adjustment purposes, it should be pointed out that the pin wheels 33—34 include angular adjustment means, as at 40 for the wheel 33, whereby the effective spacing of corresponding-pin engagement at wheel 33, compared to that at wheel 34, may be adjusted to produce the desired tension in the span of material 12 between said locations 33—34.

For stock having but a single perforated margin, of course only single pin wheels, such as described pin wheels 33—34, would be employed but for stock as shown in which both margins are perforated we prefer to employ second pin wheels 33'—34' for the other margin of the stock, these further pin wheels being secured to the shafts 35—36, as will be clear. For wide stock, we illustrate at the break-out 41 in FIG. 1 spaced discs or flanges 42 which may be secured to shafts such as 35 between pin wheels 33—33' to avoid any possibility of stock buckling.

In order that the stock may be assured uniform application to sprocket means, such as pin wheels 33—33', we show associated with each pin-wheel location a guide fork, such as the fork 43, having a hub or boss 44 secured to a transverse rod 45. The rod 45 is supported at both ends in the angle members 29—30 and extends through member 29 where it is secured to a crank 46 for use by the operator when setting up the machine. Normally, the crank 46 is in the lowered position shown wherein a knob or headed pin 47 is spring-urged inwardly to engage a locking aperture (not shown) in the side member 29. This locked relation provides a fixed reference for the angular position of rod 45, and the guide fork 43 is so adjusted at 44' on rod 45 that it freely clears pin wheel 33 (for any thickness of stock therebetween) but yet assures that the stock will positively lay down upon all pins, as they successively project between the arms of the fork. The same considerations apply with respect to the setting of forks 43' (with respect to pin wheel 33') and 48—48' (with respect to pin wheels 34—34'), as will be clear.

As explained briefly above, the table 26 is continuously driven in a reciprocating cycle of longitudinal movement on the guides 24—25. Concurrently, the stock-feed means at 33—34 is continuously driven with an effective surface-feed speed (of the stock 12 with respect to the center of wheel 33) which substantially equals the maximum return-stroke speed for the table 26. Table drive may employ cam and follower mechanism, but we prefer continuous simple-harmonic reciprocating motion. The mechanism for achieving this feed relation will now be described.

Referring to FIGS. 2 and 3, basic drive is developed from motor 50 mounted on the frame beneath the table and between the front and back plates 21. Motor output is delivered to a shaft 51 on the rear side of the machine, and from this shaft the various drives to be synchronized are picked off.

For table reciprocation, the back angle member 30 (FIG. 4) is shown supporting guide means extending perpendicular to the reciprocation motion and comprising spaced guide blocks 52—53 defining a guide passage, designated generally 54, within which a crank roll 55 may move. The crank roll 55 is mounted for free rotation on an adjustment block 56, slidably guided in radial-slot means 57 in a crank plate 58. Adjustable means 59 is provided to set the desired throw of the crank roll 55 during a cycle of rotation of the crank plate 58 about the shaft 60 on which it is mounted. Pinion gears 61—62 on the shafts 51—60 (meshing with an adjustably positioned idler 63) enable a desired speed relationship between rotation of shaft 51 and of the crank shaft 60 and, of course, for each rotation of the crank shaft the table 26 will be driven in a complete forward and return stroke cycle of bodily displacement along the guide means 24—25.

Continuous drive to the feed means 33—34 (and 33'—34') is developed from a second take-off from the shaft 51, as by bevel-gear means 64 to a further shaft 65 journaled in the frame and extending parallel to the displacement motion of the table 26. The shaft 65 is shown carrying an elongated drive gear 66 of length equal substantially to the maximum possible throw of the table 26, and a gear 67 journaled in the rear bracket 68 of the table 26 is in constant mesh with the elongated gear 66. Gear 67 is shown transferring continuous drive to the pin wheel shaft 36 by means of 1:1 bevel gears 69. As previously explained, a sprocket or tooth-belt connection 37 assures complete synchronism and continuous rotation of the pin wheel shafts 35—36.

The stitching or stapling head or heads 10—11 may be of various forms which are commercially available and may operate on a solenoid-actuated cycle or on an otherwise clutched and released cycle, but we indicate our preference for a head 10 (or 11) which is continuously driven and which incorporates its own internal mechanism for achieving momentary insertion of the stitching means, such as a staple. Continuous drive to one such head, such as the head 11, is suggested by the sprocket or toothed-belt 70 driving a sprocket or pulley 71 secured to the main shaft of the stitching head 11. Similar drive via a second belt 72 (FIG. 2) may be supplied to the other stitching head 10. Synchronism of operations of the stitching heads 10—11 is assured by geared connection of the intermediate shaft 73, which (through pulley 74) drives belt 70, with the intermediate shaft 75, which (through pulley 76) drives the other stitcher belt 72. The geared connection between shafts 73—75 is in the form shown accomplished by meshing 1:1 gears 77—78 which effect a reversal of the direction of rotation of shafts 73—75, without changing the speed relationship. The reason for reversing the drives to the respective stitcher heads is that, as will be seen from FIG. 1, commercial stitcher heads 10—11 have been employed; in order that they may be adjusted for stitching simultaneously as close to each other as possible they have been mounted in face-to-face opposed relation, thus calling for reversed drives to these respective heads.

The drive to intermediate shafts 73—75 may be accomplished by a variety of mechanisms as, for example, a sprocket drive from shaft 65 direct to shaft 75, but in the form shown we employ a sprocket wheel 80 on the crank shaft 60 to run a sprocket chain 81 to a driven sprocket wheel 82, with 1:1 bevel-gear connection 83 to the shaft 73.

To complete the description of the machine it should be pointed out, particularly in reference to FIG. 3, that each of the stapling heads 10—11 includes an upper or stitcher head portion 85 and a lower bracket portion 86 defining a yoke with an opening 87, for reception of one marginal edge of the material 12 to be stitched. In FIG. 3, the staple-driving tool or member 88 is shown in the down position at the moment of driving to home position a staple (not shown) against a clincher device or anvil member 89 carried by the lower bracket 86. The upper surface or plane of the anvil member 89 preferably coincides with that of the upper table surface 31 so that at the location of stitching the overhanging stock will be properly supported.

As indicated generally above and in order to render our machine more universally applicable to a variety of set-up problems, the heads 10—11 are permitted a certain flexibility of positioning longitudinally of the machine. Ordinarily, the head 10 can be viewed as a more or less stationary head and need only be positioned occasionally but, on the other hand, the head 11 may require adjustment from job to job depending upon the folded panel length for the particular stock 12 accommodated by the machine. Thus, in spite of the adjustability of the head 10, it will nevertheless be referred to as the "fixed" head and the head 11 will be referred to as the adjustably-positioned head, adjustable position being set primarily by operation of the knob or hand wheel 90.

Both heads 10—11 are mounted on rugged bases 91 (for head 10) and 92 (for head 11). Each of these bases is bored for guided support on two rigid guide bars or rods 93—94 permanently secured at opposite ends of the machine and extending parallel to the path of movement of the table 26.

Adjustment of the base 91 is obtained by releasing a set screw 95 which holds the same in secured relation to one of the rods 93—94. If desired, the other head 11 may be adjustably positioned merely by employment of the same type of set-screw means 96 in conjunction with the base member 92. However, in the form shown, we additionally employ a lead screw 97 threaded into the base 92 for head 11 and driven by the manual adjustment knob or wheel 90. Thus, once the desired "fixed" setting for head 10 has been obtained and set at 95, any fine adjustment of spacing between stitching locations is achieved by operation of the knob or hand-wheel 90 to advance or retract the head 11 along the guide means 93—94. Upon achievement of the selected adjustment position of head 11, the position is secured by set screw 96, as will be clear.

The operation of our machine will, perhaps, be better understood by reference to FIG. 5 which depicts in curve A the actual displacement or position of the table 26, as a function of degrees of rotation of the crankshaft 60 during one cycle of reciprocation. Curve A commences at the fully retracted position, with the table 26 at its furthest point of displacement towards the supply 15 in FIG. 1; table 26 advances at the 180° position to a maximum forward location when it is nearest the take-up end 17.

Curve B of FIG. 5 depicts on the same cyclical scale the instantaneous velocity of table 26, beginning with zero table velocity at the time when the table is nearest to the supply end 15, progressing to a point (90° later) of maximum forward velocity (designated V+), decelerating to zero speed at the 180° position when the table is nearest the discharge end 17, reversing to a maximum retraction speed (designated V−) at the 270° position, and thence decelerating to zero speed at the 360° position for recycling.

Curve C of FIG. 5 depicts the operation of each one of the stitching units 10—11 in its proper synchronized relation with the cycle of table reciprocation. For the commercial devices employed in the machines with which we have had experience in practicing our invention, continuously driven input shaft 71 effects momentary downward projection and retraction of the staple-driving tool 88 (FIG. 3), this momentary operation being essentially confined to the period identified as "D" in curve C of FIG. 5. Actually, the projection and retraction cycle of this tool occurs generally in accordance with the curve C, but it will be appreciated that the work of driving the staple and clinching it is accomplished in the shorter interval "D" which amounts to substantially one-half of the full projection and retraction cycle of the tool 88. Hence, it is the interval "D" which is of concern in synchronizing the machine.

As previously noted, the synchronized drive to the pin-wheel shafts 35—36 is preferably such that the local surface feed speed for the stock 12 over the pin wheels 33—34 substantially matches the maximum retraction velocity V− of the table 26; by this is meant that these two velocities are for a brief moment substantially equal and of opposite sign. This situation is depicted in curve B of FIG. 5 wherein the dashed line labeled "Local Pinwheel Surface Speed" is shown to be of a magnitude V+. For the situation depicted in FIG. 5, the 270° position represents the instant at which these velocities are equal and opposite, and when the paper or stock 12 is momentarily brought to a halt beneath the stitching heads 10—11. Synchronization assures accomplishment of stapling at the instant "D" during which paper motion is negligible.

It should be noted that for high quality stapling or stitching of the character indicated, the plies of the stock 12 must be, of course, secured to each other when their notched edges are in complete register. This is achieved not only by employment of correct pin-wheel set-up at 33—33' and 34—34' but also by correct tensioning (as by adjustment at 40) to assure a predetermined amount of slack in the stock 12 between pin-wheel locations. This will enable the staple to be driven in spite of negligible paper motion during the instant "D" and, at the same time, there is absolutely no tearing of the paper in spite of this slight paper motion. Good quality stitching also demands that the staple be clinched in loose relation to the paper, and it will be appreciated that this objective is realized by adjustable positioning of anvil 89 in its support 86, as suggested at 99 (FIG. 3).

It will be seen that we have described an improved stitching or stapling machine which is effectively a continuous stapling machine, in that at the instant of stitching all movable mechanical parts are in motion, the table 26 being at its maximum velocity in the retraction direction. It is only by the differential action of the stock feed means and the table displacement that an effective momentary dwell of the stock is created at the precise location of stitching. We have found that, as compared to all stitching machines now available, our device produces a markedly superior and uniform result, with a greatly increased production rate which can be at least two to three times that of any conventional machine. Acceleration and deceleration transients are virtually eliminated, and the highest production potential of the stitching heads may be realized because these are fixedly mounted on the frame. By eliminating acceleration and deceleration transients, perfect registration is assured, regardless of whether the stock is a "two-part form" or a "ten-part form," with interleaved carbon sheets. Long life and adaptability to a wide variety of stock thicknesses and widths and stitched spacing, all without changing the production rate, are distinctive features of our machine.

While we have described the machine in detail for the preferred form shown, it is to be understood that modifications may be made within the scope of the invention as defined in the claims which follow.

We claim:

1. In a stitching machine or the like for multiple-ply material having registering feed apertures along a longitudinally extending portion thereof, a frame, elongated guide means in said frame, table means reciprocably guided by said guide means, continuously operated drive means continuously imparting a longitudinal reciprocating movement to said table, separate longitudinally spaced feed means carried by said table for the material to be stitched, each of said feed means including means having no-slip engagement with fed material and continuously driven with a rotary speed such that material fed by said feed means has a surface speed substantially equal to the maximum speed of said table with respect to the frame during one of the reciprocating strokes thereof, the no-slip engagement means of the said feed means being so angularly positioned with respect to each other that a given degree of material slack is established and maintained between said separate feed means, a stitching device positioned in register with a desired part of the material being fed and in a region traversed by said table and between said separate feed means, said stitching means having a cycle of operation that is short compared with the reciprocating cycle of the table, and means synchronizing operation of said stitching means with substantially only that part of the reciprocation cycle at which the table speed with respect to the frame substantially coincides with and is opposed in direction to the feed speed of material to be stitched, whereby said stitching means may enter the multiple-ply material to perform a stitching operation, while locally substantially arresting movement of a slack part of the said material, without tearing the material and without affecting the continuous flow of said material through said machine.

2. In a stitching or the like machine for multiple-ply material having registering feed apertures along a longitudinally extending portion thereof, a frame, elongated guide means on said frame, a table guided by said guide means, continuous drive mechanism including a continuously cycling crank for imparting reciprocating simple-harmonic motion to the table, separate longitudinally spaced work-feed means carried by the table, said work-feed means having no-slip engagement with the feed apertures and being continuously driven in synchronism with the reciprocating drive to the table, the synchronizing relationship being such that the surface feed speed of said feed means substantially equals the maximum return-stroke velocity of the table, the no-slip engagement means of said feed means being so angularly positioned with respect to each other that a given degree of material slack is established and maintained between said separate feed means, a stitching device carried by the frame and positioned in the region traversed by the table and between said separate work-feed means to stitch a portion of the material fed across the table, and means synchronizing operation of said stitching means with the reciprocating cycle of the table and between said separate feed means at substantially the instant of maximum return-stroke velocity of the table whereby said stitching means may enter the multiple-ply material to perform a stitching operation, while locally substantially arresting movement of a slack part of the said material, without tearing the material and without affecting the continuous flow of said material through said machine.

3. The machine according to claim 2, in which the crank of said reciprocating drive has an adjustable throw, whereby stitching may be accomplished at selected intervals, on the material to be stitched.

4. A machine according to claim 2, in which two stitching devices are positioned in spaced relation in the direction of feed of material to be stitched and in which common synchronizing mechanism serves both stitching devices, whereby spaced regions of the material to be stitched may be simultaneously stitched at substantially the instant of maximum return-stroke velocity of the table.

5. The machine of claim 4, in which said frame includes elongated guide means on which one of said stitching devices is adjustably positioned, said guide means being elongated in the direction of movement of the material to be stitched, whereby simultaneous stitching may be accomplished at adjustably selected spaced intervals.

6. In a stitching machine for stitching multiple plies of paper or the like stock having feed apertures along at least one edge thereof, a frame including elongated guide means, a table guided by said guide means, stock-feed means including longitudinally spaced sprocket means having a portion engaged with the feed apertures of said stock, means continuously driving said table in a cycle of reciprocation of said guide means, said last-defined means including a continuous synchronous drive connection to said spaced sprocket means, the connection being such that the stock-feed speed as driven by said sprocket is substantially equal to the maximum return-stroke speed of said table, said stock being positioned on said table with a margin to be stitched overhanging an edge of the table, the said sprocket means being so angularly positioned with respect to each other that a given degree of material slack is established and maintained between said sprocket means, a stitching device carried by said frame intermediate said spaced sprocket means and including a stitching head on one side of the overhanging stock and a clinching anvil on the other side, and a synchronizing drive to said stitching device from said drive means, the timing being such that the stitching is accomplished substantially during the instant of maximum return-stroke velocity for said table, whereby said stitching device may perform a stitching operation on said multiple-ply paper while locally substantially arresting movement of a slack part thereof without tearing the paper and without affecting the continuous flow of material through said machine.

7. The machine of claim 6, in which said sprocket means is of the disappearing-pin-wheel variety.

8. The machine according to claim 6, in which one of said spaced sprocket means includes provision for rotational adjustment with respect to the other, whereby the effective engaged-pin spacing between pins of one sprocket means and pins of the spaced sprocket means along the same length of material to be stitched may be adjusted to achieve controlled slack in the material in the region of stitching.

9. The machine according to claim 6 and for stock having feed apertures along opposite edges, in which said sprocket means comprises at each of two spaced longitudinal locations spanning the region of stitching a pair of laterally spaced feed sprockets respectively accommodating opposed edges of the material to be stitched.

10. The machine according to claim 9, in which said pairs of sprockets are mounted on spaced parallel shafts extending transverse of table movement, and means for adjustably setting one of the sprockets of each pair along its shaft so that the machine may be set up to accommodate various widths of perforated-edge stock.

11. The method of stitching multiple-ply stock, which comprises locally feeding a portion of the stock at a constant rate of speed with respect to the location of feeding contact with the stock, reciprocably displacing the point of feeding contact in an elongated displacement cycle parallel to the feeding direction at a speed such that during a portion of the return stroke of reciprocation the point of feeding contact with the stock momentarily achieves substantially zero absolute speed, maintaining a region of controlled slack in the stock in the vicinity of local feeding, and momentarily stitching a portion of the stock fed by said feed means from a stationary reference at substantially said instant and in said region of controlled slack.

References Cited in the file of this patent
UNITED STATES PATENTS

| | | |
|---|---|---|
| 552,947 | Williams | Jan. 14, 1896 |
| 1,019,929 | Webelmesser | Mar. 12, 1912 |
| 2,089,747 | Grossmith | Aug. 10, 1937 |
| 2,719,299 | Lach | Oct. 4, 1955 |
| 2,971,684 | Huck | Feb. 14, 1961 |